(12) United States Patent
Hagleitner et al.

(10) Patent No.: US 7,236,234 B2
(45) Date of Patent: Jun. 26, 2007

(54) OPTICAL SENSOR ARRANGEMENT

(75) Inventors: Walter Hagleitner, Bregenz (AT); Wilfried Mehr, Lindau (DE)

(73) Assignee: Automotive Distance Control Systems GmbH, Lindau (DE)

( * ) Notice: Subject to any disclaimer, the term of this patent is extended or adjusted under 35 U.S.C. 154(b) by 241 days.

(21) Appl. No.: 10/495,315

(22) PCT Filed: Jul. 18, 2002

(86) PCT No.: PCT/DE02/02676

§ 371 (c)(1),
(2), (4) Date: Jan. 20, 2005

(87) PCT Pub. No.: WO03/012471

PCT Pub. Date: Feb. 13, 2003

(65) Prior Publication Data

US 2005/0156102 A1    Jul. 21, 2005

(30) Foreign Application Priority Data

Jul. 20, 2001   (DE) .................... 101 35 457

(51) Int. Cl.
*G01C 3/08* (2006.01)
(52) U.S. Cl. ................... 356/4.01; 356/5.01

(58) Field of Classification Search ...... 356/4.01–5.15, 356/28; 359/613–614
See application file for complete search history.

(56) References Cited

U.S. PATENT DOCUMENTS

| | | | |
|---|---|---|---|
| 2,213,021 A | 8/1940 | Solon | |
| 2,286,219 A | 6/1942 | Martinek | |
| 3,679,887 A | 7/1972 | Kennedy | |
| 5,122,796 A | 6/1992 | Beggs et al. | |
| 5,189,554 A * | 2/1993 | Vanasse et al. | 359/601 |
| 5,321,490 A * | 6/1994 | Olson et al. | 356/5.03 |
| 5,388,048 A * | 2/1995 | Yavnayi et al. | 701/301 |
| 5,923,021 A | 7/1999 | Dvorkis et al. | |
| 6,024,458 A * | 2/2000 | Lundgren | 359/613 |
| 6,669,347 B2 * | 12/2003 | Alderson et al. | 359/614 |

FOREIGN PATENT DOCUMENTS

| | | |
|---|---|---|
| DE | 41 15 747 | 11/1992 |
| DE | 197 17 399 | 6/1999 |

* cited by examiner

*Primary Examiner*—Thomas H. Tarcza
*Assistant Examiner*—Isam Alsomiri
(74) *Attorney, Agent, or Firm*—W. F. Fasse; W. G. Fasse

(57) ABSTRACT

An optical sensor arrangement is protected against interfering environmental influences by a transparent cover. To avoid interfering reflections, a baffle with lamellae oriented in the direction of the emitted and reflected light is arranged between the cover and the transmitting-receiving device.

6 Claims, 1 Drawing Sheet

OPTICAL SENSOR ARRANGEMENT

FIELD OF THE INVENTION

The invention relates to an optical sensor arrangement for emitting light and detecting resulting reflected light.

BACKGROUND INFORMATION

Such a sensor arrangement is, for example, known from the DE 41 15 747 C2. The known sensor arrangement comprises a transmitting-receiving device with a transmitting part for the emission of light into an observation space and a receiving part for the detection of the light reflected in the observation space. The essential disadvantage of this sensor arrangement is that it comprises a high sensitivity with respect to interfering environmental influences, especially with respect to moisture and contaminations.

SUMMARY OF THE INVENTION

Therefore, it is the underlying object of the invention to present an optical sensor arrangement that has a high operating security and a low sensitivity with respect to environmental influences.

According to the invention, a cover is provided in the beam path of the light emitted by the transmitting-receiving device and of the light reflected in the observation space to the transmitting-receiving device. The cover is transparent to the emitted and reflected light. Thus, the transmitting-receiving device monitors or detects the observation space through the cover, and it is therefore not directly subjected to the environmental influences. Moreover, a light baffle or shutter is provided between the transparent cover and the sensor arrangement. The light baffle or shutter comprises lamellae oriented in the direction of the emitted and reflected light. It is prevented by the baffle, that light, which is emitted by the transmitting-receiving device, manages to return, by reflection from the transparent cover, back to the transmitting-receiving device and there is detected by the receiving part.

Preferably, the sensor arrangement finds application in a motor vehicle, whereby the transmitting-receiving device is arranged behind a windshield of the motor vehicle functioning as a transparent cover.

The sensor arrangement according to the invention is best suited for the realization of apparatuses for the object recognition, spacing distance determination, or visibility range or sight distance determination, which find application in motor vehicles in systems for the driver assistance or support.

BRIEF DESCRIPTION OF THE DRAWINGS

An example embodiment of the invention is described in further detail in the following in connection with figures. It is shown by.

DETAILED DESCRIPTION OF AN EXAMPLE EMBODIMENT OF THE INVENTION

Figure 1:
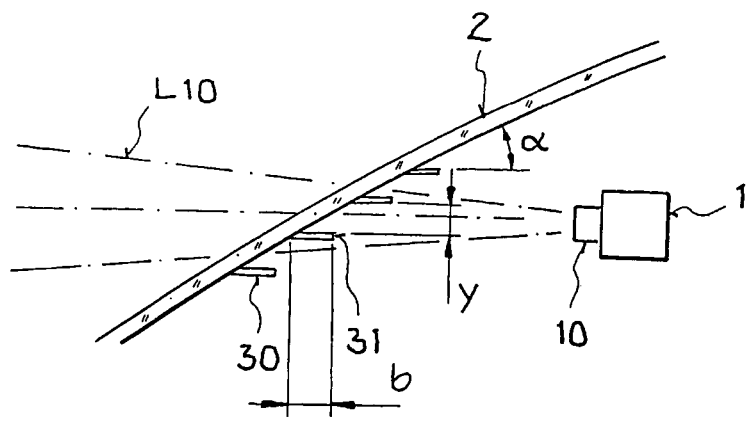
FIG. 1 a side view of an optical sensor arrangement according to the invention.

According to FIG. 1, the sensor arrangement comprises a transmitting-receiving device 1, which is arranged in the driver's compartment of a motor vehicle behind the windshield 2, and which serves for the optical monitoring or detection of an observation space located in front of the motor vehicle. In that regard, the windshield 2 functions as a transparent cover, which protects the transmitting-receiving device 1 from environmental influences, especially from moisture and contaminations.

The transmitting-receiving apparatus 1 comprises a transmitting part 10 as well as a receiving part arranged next to the transmitting part 10. In FIG. 1, the receiving part is not illustrated, because in this view it is located behind the transmitting part 10 and thus is covered or hidden thereby. The transmitting part 10 is provided for the emission of light, which penetrates as a light beam L10 through the windshield 2 into the observation space, is reflected from objects located there, and reaches the receiving part as reflected light through the windshield 2 and is detected by the receiving part.

In that regard, the emitted light L10 is radiated or transmitted from the transmitting part 10 as modulated light, for example as a pulsed infrared laser beam. Then, a demodulation is carried out in the receiving part, to suppress stray or extraneous light components that are not modulated in the manner corresponding to the emitted light L10 and are thus not correlated with the emitted light L10.

Reflections arising on the windshield 2 could be problematic. A portion of the emitted light L10 could thereby be reflected into the vehicle interior compartment from the windshield 2 that is tilted or sloped relative to the monitoring or observation direction. There, the portion of the emitted light could be reflected from objects back to the windshield 2, and could be reflected from the windshield 2 to the receiving part of the transmitting-receiving device 1. The evaluation of this light reflected in the vehicle interior compartment would lead to erroneous results, because the objects, from which the emitted light is reflected in the vehicle interior compartment, could be regarded mistakenly as objects located in the observation space.

In order to avoid these problems, a light baffle or shutter with lamellae-shaped structure is provided on the windshield 2 on its side facing toward the transmitting-receiving device 1. In that regard, the lamellae 30, 31 of the baffle are oriented in the direction of the beam path of the light L10 emitted from the transmitting part 10 into the observation space and of the light reflected from the observation space to the receiving part, so that the emitted light L10 can make it through between the lamellae 30, 31 into the observation space, and the light reflected there can make it through between the lamellae 30, 31 to the receiving part of the transmitting-receiving device 1. The lamellae 30, 31 respectively comprise a prescribed width b, for example a width of b=1 cm, and they are respectively spaced apart from one another by a spacing distance y dependent on the width b. The ratio, width b of the lamellae 30, 31 relative to the spacing distance y of the lamellae 30, 31, in that regard amounts to b/y=tan α whereby α represents the tilt or slope angle of the cover 2 with respect to the lamellae 30, 31.

The lamellae 30, 31 represent an obstacle for the light reflected in the interior of the vehicle on the windshield 2, and thus cause a damping of the interfering reflections in the interior of the vehicle. For the increasing of the damping effect, the lamellae 30, 31 are additionally embodied light absorbing, which can be effectuated through a dark color and a dull or mat embodied surface.

Figure 2:
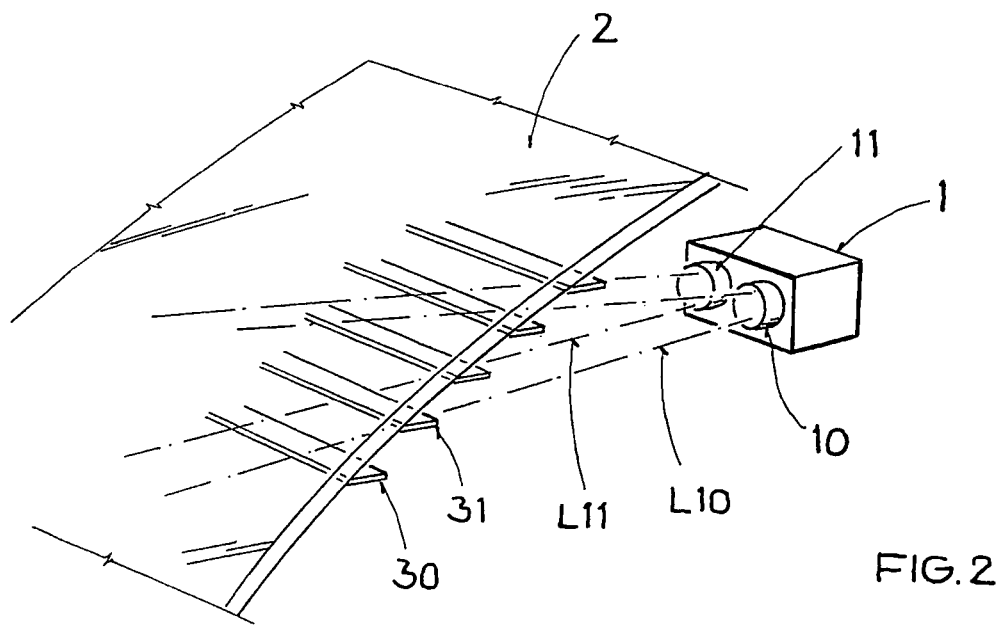
FIG. 2 a perspective view of the sensor arrangement of FIG. 1.

FIG. 2 shows a perspective view of the sensor arrangement of FIG. 1. In this illustration, also the receiving part 11 of the transmitting-receiving device 1 provided next to the transmitting part 10, as well as the beam path of the light L11 reflected from the observation space to the receiving part 11 can be seen.

In the present example embodiment, the baffle comprises lamellae 30, 31 simply lying parallel to one another. Also conceivable, however, are grid-shaped baffles, which comprise not only lamellae lying parallel to one another, but also lamellae lying crosswise or perpendicular to these.

The present sensor arrangement is a part of a system for the assistance or support of the driver of a motor vehicle. In this application or use, the object of the sensor arrangement is to sample the scene located in front of the motor vehicle in the driving direction. The information acquired hereby is then further processed in a signal processing arrangement, with the goal of recognizing objects of the scene, especially vehicles driving ahead. Through evaluation of the signal transit time of the emitted and reflected light, the spacing distance between the motor vehicle and a preceding vehicle driving ahead is then determinable. On the basis of the determined spacing distance, it can thereafter be tested, whether the safe spacing distance to the vehicle driving ahead is being maintained, and, if applicable, a warning signal is given-off or emitted to the driver, or an automatic spacing distance regulation of the spacing distance to the preceding vehicle driving ahead can be carried out. Moreover, the sensor arrangement can be utilized for the visibility range or sight distance determination and for the warning of the driver if the visibility range is not sufficient for a safe recognition of the objects relevant for the traffic. In that regard, the visibility range determination is based on the evaluation of the signal transit time of the light emitted into the observation space and the light reflected there from water droplets.

The invention claimed is:

1. Optical sensor arrangement with a transmitting-receiving device (1) for the emission of light (L10) in a direction toward an observation space and for the detection of light (L10) reflected in the observation space in reply to the emitted light, characterized in that a cover (2) transparent to the emitted and reflected light is arranged in a beam path of the emitted and reflected light (L10, L11) wherein the cover extends at a non-perpendicular angle relative to the beam path of the emitted and reflected light, and in that a baffle with lamellae (30, 31) oriented in a direction of the emitted and reflected light (L10, L11) is arranged on the cover on a side thereof facing toward the transmitting-receiving device (1).

2. Sensor arrangement according to claim 1, characterized in that the transparent cover (2) is a windshield of a motor vehicle.

3. Motor vehicle with a sensor arrangement according to claim 1 for the object recognition, spacing distance determination, or visibility range determination.

4. Sensor arrangement according to claim 1, wherein said lamellae have a width (b) in said direction of the emitted and reflected light and a spacing distance (y) apart from one another such that a ratio (b/y) of said width to said spacing distance corresponds to the value (tan α) of the tangent of said non perpendicular angle (α).

5. In a motor vehicle having a windshield between an exterior environment and a cabin interior space, an improved optical sensor arrangement comprising:
   a light emitter arranged in said cabin interior space and oriented so as to emit emitted light along an emitted light beam path from said light emitter through said windshield into said exterior environment;
   a light receiver arranged adjacent to said light emitter in said cabin interior space and oriented so as to receive, along a reflected light beam path through said windshield, reflected light resulting from refection of said emitted light in said exterior environment; and
   a baffle arranged between said windshield on one side and said light emitter and said light receiver on an opposite side of said baffle, so that said emitted light beam path and said reflected light beam path extend through said baffle, wherein said baffle includes plural lamellae extending longitudinally transverse to said beam paths and along said windshield, and wherein said lamellae have respective widths of said lamellae extending along said beam paths.

6. The optical sensor arrangement in the motor vehicle according to claim 5, wherein said lamellae are arranged so as to permit said emitted light and said reflected light to pass through said baffle and so as to block reflections of said emitted light from an inner side of said windshield.

* * * * *

UNITED STATES PATENT AND TRADEMARK OFFICE
CERTIFICATE OF CORRECTION

PATENT NO. : 7,236,234 B2
APPLICATION NO. : 10/495315
DATED : June 26, 2007
INVENTOR(S) : Hagleitner et al.

It is certified that error appears in the above-identified patent and that said Letters Patent is hereby corrected as shown below:

Column 4,
Line 15, after "said", replace "non perpendicular" by --non-perpendicular--;
Line 26, after "from", replace "refection" by --reflection--.

Signed and Sealed this

Fifth Day of October, 2010

David J. Kappos
*Director of the United States Patent and Trademark Office*